United States Patent [19]

Foschini

[11] Patent Number: 4,631,734
[45] Date of Patent: Dec. 23, 1986

[54] CROSS-POLARIZATION CANCELER/EQUALIZER

[75] Inventor: Gerard J. Foschini, Sayreville, N.J.

[73] Assignee: AT&T Bell Laboratories, Murray Hill, N.J.

[21] Appl. No.: 714,441

[22] Filed: Mar. 21, 1985

[51] Int. Cl.$^4$ .............................................. H03H 7/30
[52] U.S. Cl. ..................................... 375/15; 375/102; 375/103; 455/295
[58] Field of Search ............... 370/6, 20; 455/60, 273, 455/276, 278, 283, 295, 303, 306; 375/14, 15, 39, 100, 103, 102; 364/724; 333/18, 20, 28 R; 179/170.2, 170.6; 343/361, 362, 383

[56] References Cited

U.S. PATENT DOCUMENTS

| | | | |
|---|---|---|---|
| 3,391,339 | 7/1968 | Lynch | 370/20 |
| 4,053,837 | 10/1977 | Ryan et al. | 375/15 |
| 4,074,086 | 2/1978 | Falconer et al. | 179/170.2 |
| 4,112,370 | 9/1978 | Monsen | 375/14 |
| 4,283,795 | 8/1981 | Steinberger | 455/283 |
| 4,306,307 | 12/1981 | Levy et al. | 375/39 |
| 4,321,705 | 3/1982 | Namiki | 375/14 |
| 4,349,889 | 9/1982 | van den Elzen et al. | 364/724 |
| 4,369,519 | 1/1983 | Yuuki et al. | 455/60 |
| 4,412,341 | 10/1983 | Gersho et al. | 375/102 |
| 4,479,258 | 10/1984 | Namiki | 455/295 |
| 4,521,878 | 6/1985 | Toyonaga | 375/39 |
| 4,577,330 | 3/1986 | Kavehrad | 375/15 |

OTHER PUBLICATIONS

Ehrenbard et al., Globecom '82, Miami, Fla., vol. 2, pp. D8.4.1-D8.4.5.
Van Gerwin et al., IEEE Jrnl. Sel. Areas Comm., vol. SAC-2, No. 2, Mar. 1984, pp. 314-323.
Sato, IEEE Trans. Comm., vol. COM-23, No. 6, Jun. 1975, pp. 679-682.
Mueller, BSTJ, vol. 58, No. 2, Feb. 1979, pp. 491-500.
Godard, IEEE Trans. Comm., vol. COM-28, No. 11, Nov. 1980, pp. 1867-1875.
Gersho et al., BSTJ, vol. 60, No. 11, Nov. 1981, pp. 1997-2021.
Mueller et al., BSTJ, vol. 60, No. 11, Nov. 1981, pp. 2023-2038.
Holte et al., IEEE Trans. Comm., vol. COM-29, No. 11, Nov. 1981, pp. 1573-1581.

Primary Examiner—Benedict V. Safourek
Attorney, Agent, or Firm—Erwin W. Pfeifle

[57] ABSTRACT

The present invention relates to a cross-polarization equalizer/canceler which simultaneously performs cross-polarization equalization/cancellation in a tapped delay line (TDL) matrix. More particularly, the present equalizer/canceler receives the first and second orthogonally polarized digital signals on separate paths which are each split into a straight through and cross-over paths that include a TDL matrix comprising a separate TDL, with a predetermined number of complex taps, in each of the paths. The individual complex taps are appropriately adjusted in response to control signals from a tap adjusting means which derives the appropriate control signals from current tap signals and computed gradients derived from a predetermined algorithm. Accurate data decisions, however, are not needed. The resultant TDL output signals in the merging straight-through and cross-over paths at the output of the TDL matrix are combined to converge each of the polarized signals for propagation along the straight-through paths.

4 Claims, 3 Drawing Figures a,h,c,y,z, AND s ARE ALL DOUBLY INFINTE
COMPLEX SEQUENCES

CROSS-POLARIZATION CANCELER/EQUALIZER

TECHNICAL FIELD

The present invention relates to a cross-polarization canceler/equalizer which concurrently performs equalization and cross-polarization cancellation.

DESCRIPTION OF THE PRIOR ART

Transmission systems that use electromagnetic waves can take full advantage of the transverse nature of these waves by utilizing two distinct states of polarization to increase channel capacity without using additional bandwidth. Dual-polarization transmission has been used extensively in satellite communications and is receiving considerable attention for terrestrial radio. A propagation medium other than empty space will, in general, depolarize the electromagnetic waves, with the result of introducing cross-polarization coupling between the two distinct polarization channels.

Cross-polarization cancelers have been devised to reduce or substantially cancel cross-polarization components received in each of the polarization channels. One such arrangement is disclosed in U.S. Pat. No. 4,283,795 issued to M. L. Steinberger on Aug. 11, 1981. There, a first desired polarized signal and a second interfering orthogonally polarized signal, are concurrently received and transmitted along separate paths. The two signals are recombined after the phase and amplitude of the second interfering signal have been appropriately adjusted to maximally cancel the cross-polarization components in the desired signal. A feedback path is provided to obtain a sample of any remaining interfering signal in the recombined signal, generate a signal representative of the power envelope of such sample, and then generate appropriate control signals to provide improved adjustment of the amplitude and phase of the received orthogonally polarized interfering signal sample.

The use of equalization has also been discussed in the article "Self-Recovering Equalization And Carrier Tracking In A Two-Dimensional Data Communication System" by D. N. Godard in *IEEE Transactions On Communications*, Vol. COM-28, No. 11, November 1980 at pages 1867–1875. The article, however, does not provide a proof that such equalization will converge for all nonzero initial tap settings.

The problem in the prior art is to provide a cross-polarization cancellation technique which will provide concurrent cross-polarization cancellation and equalization to remove all elements of cross-polarization interference in received orthogonally polarized signals without requiring data decisions and without insertion of equalizer training signals.

SUMMARY OF THE INVENTION

The foregoing problem in the prior art has been solved in accordance with the present invention which relates to a cross-polarization canceler/equalizer which concurrently performs equalization and cross-polarization cancellation.

It is an aspect of the present invention to provide a cross-polarization canceler/equalizer which includes a tapped delay line matrix in the main and cross-over paths of the canceler/equalizer, and a separate feedback path including a tap adjuster means for each polarized signal, with each tap adjuster means connecting to the appropriate tapped delay lines of the matrix for adjusting the appropriate associated complex taps to effect concurrent equalization and cross-polarization cancellation.

It is a further aspect of the present invention to provide a cross-polarization canceler/equalizer which concurrently performs equalization and cross-polarization cancellation without the need for accurate data decisions at the output of the canceler/equalizer. Additionally, the canceler/equalizer does not require a special modification of the transmitted signal to provide the cancellation/equalization function.

Other and further aspects of the present invention will become apparent during the course of the following description and by reference to the accompanying drawings.

BRIEF DESCRIPTION OF THE DRAWINGS

Referring now to the drawings.

DETAILED DESCRIPTION

For purposes of illustration, it will be assumed that a dually polarized Quadrature Amplitude Modulation (QAM) signal pair is being received after propagating through a medium subjected to slowly, random varying, frequency selective fades and cross-polarization coupling. On certain occasions the loss of signal can be so complete that an optimum receiver could not detect the data. Subsequently, a strong signal returns but carrier and timing may have wandered and the medium may have significantly changed its dispersive character. It is desirable to detect the data symbols as soon as the signal strength returns. It is the uncertainty about the various features of the received signal, apart from the inherent uncertainty associated with the information symbols and additive noise, that slows the recapture process. Carrier frequency and phase, and timing frequency and phase are all to some degree uncertain. Moreover, the 2×2 matrix transfer characteristic of a dispersive medium is also uncertain where the diagonal elements of the matrix describe the co-polarization transfer characteristics, and the off-diagonal terms express the couplings between polarizations. Such medium must be equalized to enable accurate data detection as well as providing cross-polarization cancellation. The present invention provides a method of simultaneous equalization and cross-polarization cancellation that does not require the availability of data estimates.

Figure 1:
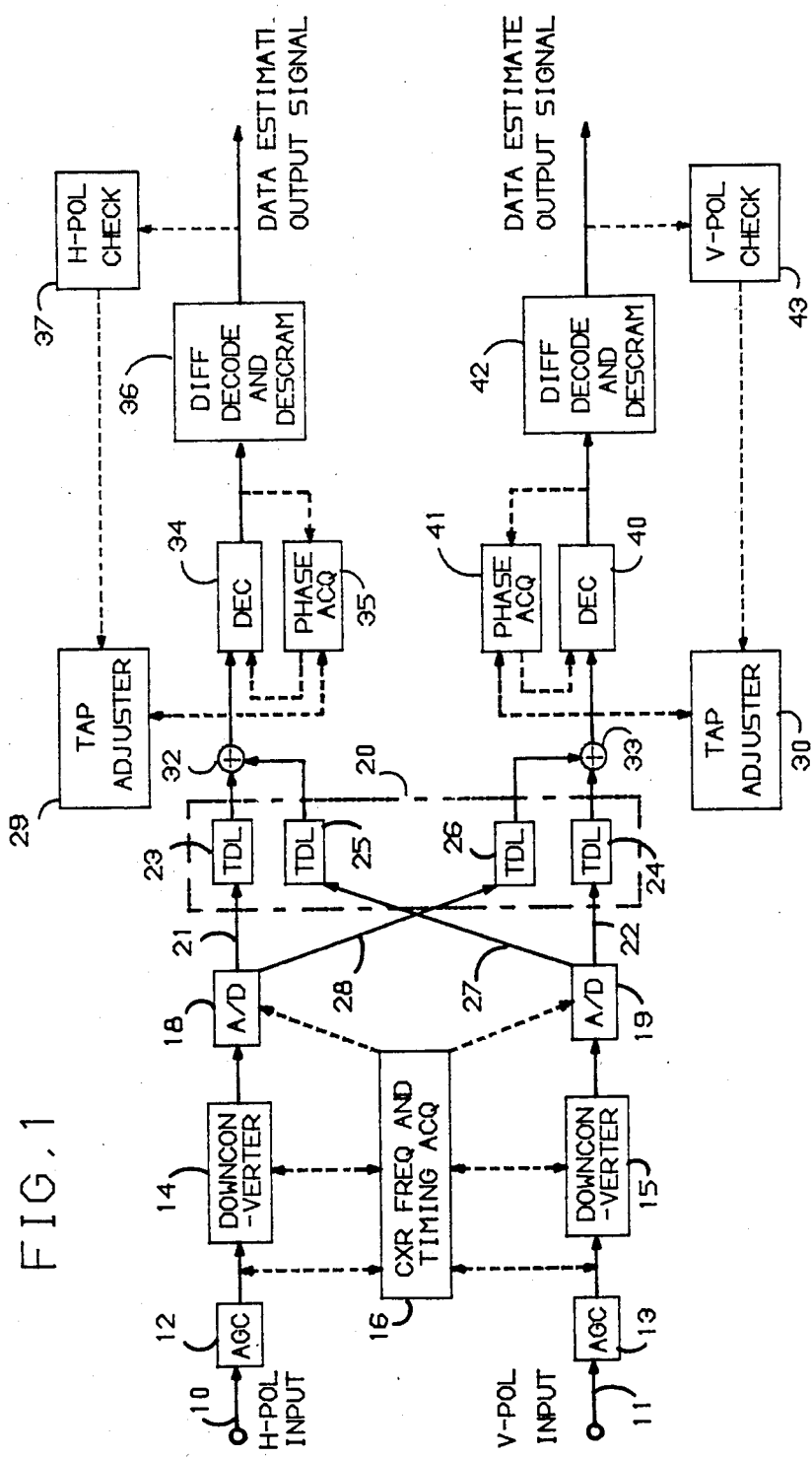
FIG. 1 is a block diagram of a cross-polarization canceler/equalizer in accordance with the present invention.

FIG. 1 is a block diagram of a cross-polarization canceler/equalizer in accordance with the present invention which receives the horizontally and vertically polarized signals, and the associated cross-polarized components, at separate inputs terminals 10 and 11, respectively. The horizontally and vertically polarized signals from input terminals 10 and 11 are passed through a first and second Automatic Gain Control (AGC) circuit 12 and 13, respectively, which function to limit the input analog polarized signal within a predetermined threshold. The output signals from AGCs 12 and 13 provide an input to Downconversion means 14 and 15, respectively, and to a carrier frequency and timing acquisition means 16. Carrier frequency and timing acquisition means 16 functions to recover the carrier frequency and timing of the exemplary dually polarized QAM received input signals. Downconversion means 14 and 15 each function to downconvert the input analog signal of the associated polarized signal in accordance with signals from carrier frequency means 16. It will be assumed hereinafter that conversion is to baseband. However, IF or even RF versions of the present invention are possible.

The dually polarized analog output signal samples from a demodulator and sampling means in Downconversion means 14 and 15 are converted to corresponding digital signals in Analog-to-Digital (A/D) converters 18 and 19, respectively, using timing control signals from carrier frequency and timing acquisition means 16. The digital output signals from A/D converters 18 and 19 are then passed through a tapped delay line (TDL) matrix 20 comprising TDLs 23 and 24 disposed in the straight-through horizontally and vertically polarized received signal paths 21 and 22, respectively, and TDLs 25 and 26 disposed in respective cross-over paths 27 and 28 to provide the simultaneous cross-polarization cancellation and equalization function in accordance with the present invention. More particularly, the Horizontal and Vertical digital signal samples are transmitted into tapped delay line matrix 20 which is responsive to control signals from tap adjusting means 29 and 30 associated with the horizontally polarized signal TDLs 23 and 25 and vertically polarized signal TDLs 24 and 26, respectively. Each of TDLs 23-26 are usually identical with the other TDLs and comprise a tapped delay line including a plurality of complex taps which configuration is well known in the art. The number of taps to be used in each of TDLs 23-26 is arbitrary and depends on the dispersiveness of the medium the signals propagate through in the path between the transmitter and receiver, and the accuracy desired in the equalized and cross-polarized canceled decoded data estimates. Therefore, the number of taps desired can be determined experimentally, with the number of taps being directly related to the dispersiveness of the medium and the accuracy desired.

The TDL sections 24,25 and 23,26 of matrix 20 function to appropriately adjust the amplitude and phase of the signals of the vertically and horizontally polarized signals, respectively, from respective A/D converters 19 and 18. The outputs from TDL sections 23 and 25 of TDL matrix 20, associated with the desired horizontally polarized signal and the interfering cross-polarized components from the received vertically polarized signals on paths 21 and 27, respectively, are added in adder means 32 to provide simultaneous equalization and cross-polarization cancellation for the desired horizontally polarized signal. Similarly, the outputs from TDL sections 24 and 26 of TDL matrix 20, associated with the desired vertically polarized signal and the interfering cross-polarized components from the received horizontally polarized signals on paths 22 and 28, respectively, are added in adder means 33 to provide simultaneous equalization and cross-polarization cancellation for the desired vertically polarized signal. It is to be understood thaat TDLs 23-26 of matrix 20 each function to provide some simultaneous equalization and cross-polarization component adjustment in the signal propagating therethrough rather than just TDLs 25 and 26 in the cross-over paths providing cross-polarization cancellation while other means provide the necessary equalization.

The output signal from adder means 32 is transmitted to a decision means 34 which makes decisions on the digital symbols based on input signals from each of adder means 32, a phase acquisition circuit 35 and tap adjusting means 29. The output from decision means 34 is differentially decoded and descrambled, if originally scrambled, in differential decoding and descrambling means 36 to obtain the data estimate output signals associated with the received horizontally polarized signal. What should be understood is that the present equalizer/canceler is capable of converging to provide a substantially pure signal, but that in converging it may be converging on another signal being received such as, for example, in path 21 the arrangement may converge onto the received vertically polarized signal rather than the desired received horizontally polarized signal. It is known to somehow differently scramble or separately identify each of the originally transmitted signals using, for example, a different code. The resultant descrambled signal is received in a polarization check circuit 37 to make sure the descrambled signal is the proper one by checking, for example, that the resultant data signal is understandable and was scrambled with the proper code, or includes the proper identifier. Horizontal polarization check circuit 37, therefore, functions to make sure that the canceler/equalizer is locked onto the right polarization.

Similarly, the output signal from adder means 33 is transmitted to a decision means 40 which makes decisions by estimating digital symbols based on input signals from each of adder means 33, a phase acquisition circuit 41, and tap adjusting means 30. The output signal from decision means 40 is differentially decoded and descrambled, if originally scrambled, in a differential decoding and descrambling means 42 to obtain the data estimate output signals associated with the received vertically polarized signal. The output signals from differential decoding and descrambling means 42 are also received by a vertical polarization check circuit 43 which functions to make sure that the canceler/equalizer is locked onto the vertically polarized received signal at the output of differential decoding and descrambling means 42. If either one of check circuits 37 or 43 provides a check indicating that a wrong signal has been locked onto, the canceler/equalizer is made to reinitialize. For example, if one of the output signals is a wrong signal, only the TDLs of TDL matrix 20 associated with the equalization/cancellation for that signal need be reinitialized. If both the output signals are locked onto the oppositely polarized signals, then the option of just switching the two output signals can be exercised rather than reinitialization. The output signals from check circuits 37 and 43, therefore, include control signals indicating whether or not the proper polarized signal has been locked onto, and such indications are provided as inputs to tap adjusting means 29 and 30, respectively. Tap adjusting means 29 and 30 each function in accordance with a predetermined algorithm to provide the appropriate control signals to TDLs 23-26 to converge the signals at the output of adder means 32 and 33. The following discussion is presented to provide an understanding of this predetermined algorithm for effecting the simultaneous equalization and cross-polarization cancellation function.

It is to be understood that Godard in his paper "Self-Recovering Equalization and Carrier Tracking In Two-Dimensional Data Communication Systems" in *IEEE Transactions on Communications*, Vol. COM-18, No. 11, November 1980 at pages 1867–1875 discusses a technique or algorithm to provide only equalization, but could not prove that an arrangement using the algorithm would converge at all times. Additionally, Godard did not disclose or suggest the possibility of simultaneous equalization and cross-polarization cancellation. In accordance with the present invention, an algorithm, which is used in tap adjusting means 29 and 30, has been developed which will converge a 2×2 matrix equalizer so that the overall system response decouples the two polarizations. The taps in the TDLs 23–26 evolve in accordance with a gradient of a vector potential. Upon convergence, the phase needs to be recovered by phase acquisition means 35 which can include, for example, separate phase lock loops.

As was stated hereinbefore, there is a possibility that, despite the perfect locking onto one polarization and the consequent perfect removal of the other polarization, the polarizations could be transposed. This ambiguity is easily resolved, as was stated hereinbefore, by using known "tagging" or "identifying" techniques with each polarization by, for example, the scrambling process. Once checking means 37 and 43 determine that the proper signal is received and send such indication to tap adjusting means 29 and 30, respectively, tap adjusting means 29 and 30 use the input signals from respective decision means 34 and 40, the respective phase acquisition means 35 and 41 and especially the present voltages at the taps of the TDLs 23–26 to determine the new tap values for convergence.

Figure 2:
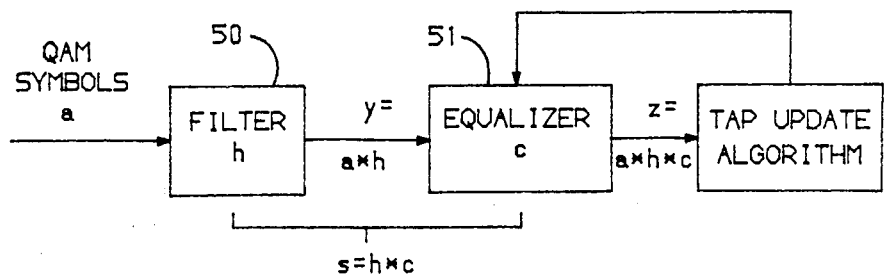
FIG. 2 is a block diagram of an equivalent baseband model for single polarization transmission.

To explain the function of each of tap adjusting means 29 and 30, some notations are required which can be defined using an equivalent baseband QAM model shown in FIG. 2. The complex input data sequence in FIG. 2 is denoted as a. The elements of $a = (\ldots a_o, a_1 \ldots)$ represent independent and identically distributed choices from a QAM constellation, each point of which is equally likely. This is normalized so that $E|a_n|^2 = 1$.

The complete sequence h in filtering means 50 represents samples of the impulse response of the transmitter and medium combination. The sequence c in equalizer means 51 represents the complex equalizer taps. Using the * symbol for convolution, the sampled impulse response of the channel and equalizer in combination is denoted $s = h*c$, the received data is denoted $y = a*h$, and the sequence after the equalizer is $z = a*h*c$. This notation is consistent with the notation of Godard. Also, h is assumed to have a continuous Fourier transform devoid of spectral nulls. Consequently, h has a convolution inverse $h^{-1}$ satisfying $h*h^{-1} = 010$. By 0 an infinite sequence of zeroes is meant, left directed if preceding a number and right directed if following a number. If 0 is written without abutting a number, it means the sequence of zeroes extending from $-$ infinity to $+$ infinity. A more refined model of the terrestrial digital radio environment would include additive while Gaussian noise at the input to the receiver. However, the major interest here is in prompt reestablishment of adequate equalization after a cataclysmic event during which the data detection capability was completely lost (so $P_e \approx \frac{1}{2}$). The situation is that the medium, despite the presence of additive noise, has the potential of providing adequate performance if only the equalizer could be properly aligned. In such situations, the SNR is generally so large that an optimal minimum means square (MMSE) equalizer, including noise effects, is only slightly better than an inverse equalizer, which neglects noise. Once the equalization can provide for a $P_e$ in the neighborhood of 0.01 to 0.1, conventional linear (MMSE) equalization is an assumed option. Moving from the model of FIG. 2 to the arrangement of FIG. 1, a two dimensional setting is needed to account for horizontally and vertically polarized signals. Here c and h are 2×2 matrices. The vectors $(z_H, z_V)$ and (a,b) are related as follows:

$$\begin{bmatrix} z_H \\ z_V \end{bmatrix} = \begin{bmatrix} c_{11} & c_{12} \\ c_{21} & c_{22} \end{bmatrix} * \begin{bmatrix} h_{11} & h_{12} \\ h_{21} & h_{22} \end{bmatrix} * \begin{bmatrix} a \\ b \end{bmatrix} \quad (1)$$

The individual elements of $z_H$, $z_V$, a and b are denoted by subscripts. We use s to denote the matrix:

$$c*h = \begin{bmatrix} c_{11}h_{11} + c_{12}h_{21} & c_{11}h_{12} + c_{12}h_{22} \\ c_{21}c_{11} + c_{22}h_{21} & c_{22}h_{21} + c_{22}h_{22} \end{bmatrix} \quad (2)$$

The matrix h is assumed to be nonsingular so that $h^{-1}$ exists:

$$\begin{bmatrix} h^{-1}*h = \begin{bmatrix} \bar{0},1\ \bar{0} & \bar{0} \\ \bar{0} & \ ^{0,}\bar{0},1\ \bar{0} \\ & 0, \end{bmatrix} \end{bmatrix} \quad (3)$$

The components of the vector (a,b) represent the QAM data sequence driving the horizontal and vertical polarizations. Of course, the elements of a and b are all independent and a vector criterion is employed to obtain the approximate gradients to be applied to each complex tap of TDLs 23–26 in accordance with the equation:

$$\begin{bmatrix} \min_{(c_{11}c_{12})} E & (|z_{Hn}|^2 - E|a_n|^4)^2 \\ \min_{(c_{21}c_{22})} E & (|z_{vn}|^2 - E|b_n|^4)^2 \end{bmatrix} \quad (4)$$

It should be noted that optimization of these two components proceeds independently of each other in that the first component involves $c_{11}$ and $c_{12}$ while the second involves $c_{21}$ and $c_{22}$. Therefore, tap adjusting means 29 and 30 operate in accordance with the top and bottom expressions, respectively, of Equation (4).

Figure 3:
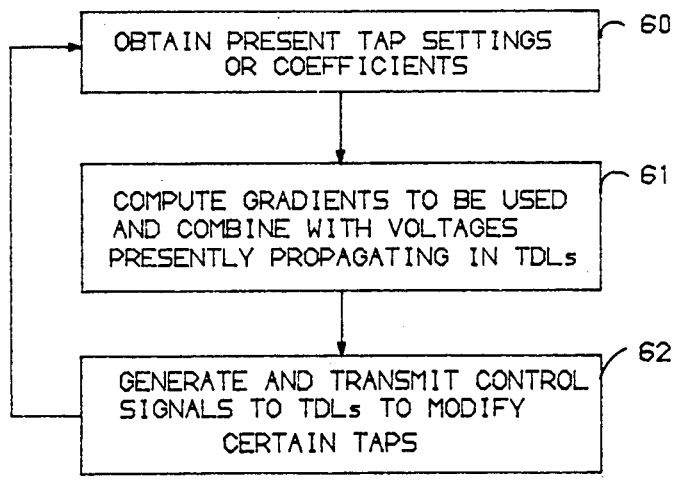
FIG. 3 is a flow diagram for each of the tap adjusting means of FIG. 1 for generating the appropriate tap matrix settings.

Each of tap adjusting means 29 and 30 can comprise, for example, a microcomputer and an associated memory for storing the sequence of instructions for performing the steps shown in FIG. 3 including the calculations using Equation (4) above. More particularly, as shown in FIG. 3, each of tap adjusting means 29 and 30 operate to (a) take the present tap coefficients or settings, indicated in box 60, which may be stored in a scratchpad portion of the memory of the microcomputer; (b) compute the gradients in accordance with Equation (4) and add those gradients to the voltage values determined as presently propagating in TDLs 23–26, as indicating in box 61, to determine the new complex tap settings for convergence; and (c) use the determined new tap settings to generate and transmit appropriate control signals to TDLs 23–26 for modifying these complex tap settings to a desired new value as indicated in box 62. It is to be understood that each complex tap setting is preferably modified one predetermined step size at a time to provide convergence, but could use more than one step size if desired.

The feature that the algorithm appears to have no preference as to which tap should be a reference tap implies that, with finitely many taps, the tap weight distribution could crowd to one end of the equalizer. To avoid a lopsided tap weight distribution in TDLs 23–26, the center of gravity of the tap weights could periodically be computed, e.g., every few hundred symbols, and then shift the weights to situate the balance point as close as possible to a central tap of each TDL. A computationally simpler alternative to the center of gravity method described hereinabove is to periodically compare the weights of the first and last tap of each TDL and then shift tap weights by one in the direction of the least weight.

In the foregoing discussion, it is to be understood that elements 12–16 and 18–19 of FIG. 1 are merely provided for purposes of illustration as a technique for providing dually polarized signals as separate inputs to the TDL matrix 20 for effecting the simultaneous equalization and cross-polarization cancellation function in accordance with the present invention. Similarly, other and further modifications could be made to the arrangement of FIG. 1 and still stay within the spirit and scope of the present inventive concept.

What is claimed is:

1. A cross-polarization equalizer/canceler for concurrently equalizing and canceling cross-polarization components in a first and a second orthogonally polarized digital signal, the equalizer/canceler comprising:
    a first and second input terminals for receiving the first and second orthogonally polarized signal, respectively;
    a first and a second straight-through path (21,22) coupled to the first and second input terminal, respectively;
    a tapped delay line matrix (20) comprising a separate tapped delay line (TDL) in each of the first and second straight-through paths and each of the first and second cross-over paths, each TDL including a plurality of complex taps which are individually responsive to control signals for appropriately changing a current tap setting and a resultant output signal of each TDL;
    a first adder means (32) for adding the output signals from the TDLs in the first straight-through path and the second cross-over path;
    second adder means (33) for adding the output signals from the TDLs in the second straight-through path and the first cross-over path; and
    tap adjusting means (29, 30) coupled to the output of the first and second adder means and to the complex taps of the TDLs in the TDL matrix for generating appropriate control signals to the complex taps of the TDL matrix for appropriately changing the tap settings to effect concurrent equalization and cross-polarization component convergence in each of the first and second orthogonally polarized signals at the output of the first and second adder means, respectively, the tap adjusting means generating the appropriate control signals to each of the complex taps as derived from the addition of an associated current complex tap signal and an updated gradient representative of a vector of the component of the associated TDL signal in accordance with the relationship $$\min E \, (|z_{Hn}|^2 - E|a_n|^4)^2$$
$$(c_{11}c_{12})$$

$$\min E \, (|z_{vn}|^2 - E|b_n|^4)^2$$
$$(c_{21}c_{22})$$

where E represents an average of the associated term; $a_n$ and $b_n$ are the $n^{th}$ complex data symbol of the first and second orthogonally polarized signals, respectively; $z_{Hn}$ and $Z_{vn}$ are the complex samples at time nT of the first and second orthogonally polarized signals, respectively, at the output of the respective first and second adder means; and $c_{i,j}$ identify a TDL within the TDL matrix where i and j designate the input to output path, respectively, of the TDL and 1 and 2 indicate the respective first and second orthogonally polarized signals.

2. A cross-polarization equalizer/canceler according to claim 1 wherein the first and second orthogonally polarized signals include separate Quadrature Amplitude Modulated (QAM) encoded signals, and
    the tap adjusting means derives the appropriate gradients to be added to the current complex tap signals in accordance with the relationship $$\begin{bmatrix} \min E & (|z_{Hn}|^2 - E|a_n|^4)^2 \\ (c_{11}c_{12}) & \\ \min E & (|z_{vn}|^2 - E|b_n|^4)^2 \\ (c_{21}c_{22}) & \end{bmatrix}$$

where E represents an average of the associated term; $a_n$ and $b_n$ are the $n^{th}$ complex data symbol of the first and second orthogonally polarized signals, respectively; $z_{Hn}$ and $z_{Vn}$ are the complex samples at time nT of the first and second orthogonally polarized signals, respectively, at the output of the respective first and second adder means; and $c_{i,j}$ identify a TDL within the TDL matrix where i and j designate the input to output path, respectively, of the TDL and 1 and 2 indicate the respective first and second orthogonally polarized signals.

3. A cross-polarization equalizer/canceler according to claim 1 wherein each of the first and second orthogonally polarized input signals includes a different encoded identification means, the equalizer/canceler further comprising:
    means (37, 43) responsive to the output signals from the first and second adder means for separately checking the encoded identification of each the output signals to determine whether the output signals from the first and second adder means are the converged first and second orthogonally polarized signals, respectively, and for generating a first and second output signal to the tap adjusting means indicative of a respective match or non-match of the encoded identification for each of the converged output signals; and
    the tap adjusting means includes means responsive to a second output signal from the identification checking means for causing a reinitialization of the TDL matrix to a predetermined setting.

4. A cross-polarization equalizer/canceler according to claim 1 wherein the tap adjusting means comprises:
    means for periodically comparing the weight distribution at the complex taps of each TDL of the TDL matrix and for changing the overall tap weight distribution of the complex taps in the TDLs to provide a balance point substantially at the central taps of the TDLs.

* * * * *